United States Patent
Li et al.

(10) Patent No.: US 10,965,904 B2
(45) Date of Patent: Mar. 30, 2021

(54) DISPLAY METHOD AND DISPLAY DEVICE, TELEVISION AND STORAGE MEDIUM

(71) Applicant: SHENZHEN SKYWORTH-RGB ELECTRONIC CO., LTD., Shenzhen (CN)

(72) Inventors: Xin Li, Shenzhen (CN); Tiejun Lu, Shenzhen (CN); Jian Huang, Shenzhen (CN); Wensheng Hong, Shenzhen (CN)

(73) Assignee: SHENZHEN SKYWORTH-RGB ELECTRONIC CO., LTD., Shenzhen (CN)

(*) Notice: Subject to any disclaimer, the term of this patent is extended or adjusted under 35 U.S.C. 154(b) by 0 days.

(21) Appl. No.: 16/977,910

(22) PCT Filed: Aug. 22, 2018

(86) PCT No.: PCT/CN2018/101741
§ 371 (c)(1),
(2) Date: Sep. 3, 2020

(87) PCT Pub. No.: WO2020/010671
PCT Pub. Date: Jan. 16, 2020

(65) Prior Publication Data
US 2021/0044776 A1    Feb. 11, 2021

(30) Foreign Application Priority Data

Jul. 12, 2018 (CN) .......................... 201810774237.3

(51) Int. Cl.
*H04N 7/01* (2006.01)
*H04N 5/445* (2011.01)
*H04N 5/60* (2006.01)

(52) U.S. Cl.
CPC ....... *H04N 7/0117* (2013.01); *H04N 5/44504* (2013.01); *H04N 5/60* (2013.01)

(58) Field of Classification Search
CPC .... H04N 5/45; H04N 21/4316; H04N 21/431; H04N 21/4318; H04N 5/46; H04N 5/60;
(Continued)

(56) References Cited

U.S. PATENT DOCUMENTS

2007/0297513 A1   12/2007   Biswas et al.
2010/0214472 A1*  8/2010   Tomonaga ............ G06T 3/4053
                                                          348/441

FOREIGN PATENT DOCUMENTS

CN    204836434 U    12/2015
CN    204887293 U    12/2015
(Continued)

OTHER PUBLICATIONS

First Office Action in counterpart Chinese Application No. 201810774237.3, dated Apr. 3, 2019.
(Continued)

*Primary Examiner* — Sherrie Hsia
(74) *Attorney, Agent, or Firm* — Westbridge IP LLC

(57) ABSTRACT

Disclosed is a display method, including: decoding an input signal comprising an audio signal and a video signal, and identifying a resolution of the decoded video signal; in response that the video signal has an 8K resolution, outputting the video signal to an back end for processing through a first interface, and outputting an on-screen display adjustment signal to the back end for processing through a second interface; in response that the video signal has a 4K or 2K resolution, preprocessing outputting the video signal to the back end for processing through the second interface, and outputting the OSD signal generated by the SoC to the back end for processing through the first interface; and mixing and coding the video signal and the OSD signal, and outputting the mixed and coded signals to a screen for display.

20 Claims, 6 Drawing Sheets

(58) Field of Classification Search
CPC ............... H04N 21/4314; H04N 5/445; H04N 5/44504; H04N 7/0117; H04N 7/015; H04N 7/01
USPC ....... 348/563–565, 569, 441, 584, 588, 598; 345/629, 630; 725/40, 100, 109, 116, 725/151, 139, 131
See application file for complete search history.

(56) References Cited

FOREIGN PATENT DOCUMENTS

| | | |
|---|---|---|
| CN | 105657487 A | 6/2016 |
| CN | 105657491 A | 6/2016 |
| CN | 105872419 A | 8/2016 |
| CN | 107493444 A | 12/2017 |
| CN | 107566765 A | 1/2018 |

OTHER PUBLICATIONS

International Search Report and Written Opinion in corresponding PCT Application No. PCT/CN2018/101741, dated Apr. 3, 2019.

\* cited by examiner

DISPLAY METHOD AND DISPLAY DEVICE, TELEVISION AND STORAGE MEDIUM

CROSS REFERENCE TO RELATED APPLICATIONS

The present application is the National Stage of International Application No. PCT/CN2018/101741, filed Aug. 28, 2018, which claims the benefit of Chinese patent application filed with the National Intellectual Property Administration on Jan. 30, 2019, with the application number 201810774237.3 and the Title "Display method and display device, television and storage medium", the entire contents of which are hereby incorporated by reference.

TECHNICAL FIELD

The disclosure relates to the technical field of image display processing, in particular to a display method, a display device, a television and a computer readable storage medium.

BACKGROUND

With the development of TV and display and the increasing requirements of audio and visual experience, the future display products will lead to trends towards a larger size and higher resolution. The increasing size of the screen and the pixels may lead the viewing clarity deteriorate accordingly. At present, the mainstream screen resolutions are 2K(1920*1080) and 4K(3840*2160). With the increasing size of the screen, even the screen with 4K resolution will feel very grainy when viewed at a certain distance, which will affect the viewing experience. Therefore, the screen with 8K(7680*4320) resolution will be the trend for future.

However, with the improvement of display clarity, the TV's 8K decoding ability and back-end video processing ability need to be strengthened. At present, 8K video decoding can only be processed by adding 8K decoding chip, and then 8K video signals in HDMI or VBO format can be output to the back-end for further processing. In the related art, it is typically impossible to call up OSD menu (on-screen display, on-screen menu adjustment mode), the OSD menu can only be called up after exiting the playing video. If the OSD menu is forcibly called up when playing 8K/120 Hz video, the OSD menu will have poor display and blurred edges, which will affect the user experience.

SUMMARY

The present disclosure is to provide a display method, a display device, a television and a computer readable storage medium, to avoid poor display of OSD menu images when playing videos with 8K resolution.

The present disclosure provides a display method, including:

decoding, by a SoC, an input signal comprising an audio signal and a video signal, and identifying a resolution of the decoded video signal;

in response that the video signal has an 8K resolution, outputting the video signal to an back end for processing through a first interface, and outputting an on-screen display adjustment signal (OSD signal) to the back end for processing through a second interface, wherein the OSD signal is generated from the SoC;

in response that the video signal has a 4K or 2K resolution, preprocessing outputting the video signal to the back end for processing through the second interface, and outputting the OSD signal generated by the SoC to the back end for processing through the first interface;

mixing and coding the video signal and the OSD signal, and outputting the mixed and coded signal to a screen for display, wherein the video signal and the OSD signal has a same signal format, a same resolution and a same refresh rate.

In some embodiments, the first interface includes a PCI-E interface, and the second interface comprises a VBO interface.

In some embodiments, the operation of in response that the video signal has an 8K resolution, outputting the video signal to an back end for processing through a first interface, and outputting an on-screen display adjustment signal (OSD signal) to the back end for processing through a second interface, wherein the OSD signal is generated from the SoC, includes:

in response that the video signal has the 8K resolution, converting, by the SoC, the video signal into a PCI-E format and outputting the video signal to an 8K decoding chip through the PCI-E interface, to allow the 8K decoding chip to convert the video signal into a VBO format;

outputting the video signal in the VBO format converted by the 8K decoding chip to an image processing chip, to allow the image processing chip to enhance the refresh rate of the video signal;

in response that the video signal has the 8K resolution, converting, by the SoC, the OSD signal generated by the SoC into the VBO format, and outputting the OSD signal to the image processing chip through the VBO interface, to allow the image processing chip to enhance the resolution and the refresh rate of the OSD signal, respectively.

In some embodiments, the operation of in response that the video signal has a 4K or 2K resolution, preprocessing outputting the video signal to the back end for processing through the second interface, and outputting the OSD signal generated by the SoC to the back end for processing through the first interface, includes:

in response that the video signal has the 4K resolution, converting, by the SoC, the video signal into a VBO format, and outputting the video signal to the image processing chip through the VBO interface, to allow the image processing chip to enhance the resolution and the refresh rate of the video signal, respectively.

in response that the video signal has the 4K resolution, converting, by the SoC, the OSD signal generated by the SoC into a PCI-E format and outputting the video signal to an 8K decoding chip through the PCI-E interface, to allow the 8K decoding chip to convert the OSD signal into a VBO format;

outputting the OSD signal in the VBO format converted by the 8K decoding chip to an image processing chip, to allow the image processing chip to enhance the resolution and the refresh rate of the OSD signal.

In some embodiments, the operation of in response that the video signal has a 2K or 2K resolution, preprocessing outputting the video signal to the back end for processing through the second interface, and outputting the OSD signal generated by the SoC to the back end for processing through the first interface, includes:

in response that the video signal has the 2K resolution, enhancing the 2K resolution into the 4K resolution, converting, by the SoC, the video signal into a VBO format, and outputting the video signal to the image processing chip through the VBO interface, to allow the image processing chip to enhance the resolution and the refresh rate of the video signal, respectively.

in response that the video signal has the 2K resolution, converting, by the SoC, the OSD signal generated by the SoC into a PCI-E format and outputting the video signal to an 8K decoding chip through the PCI-E interface, to allow the 8K decoding chip to convert the OSD signal into a VBO format;

outputting the OSD signal in the VBO format converted by the 8K decoding chip to an image processing chip, to allow the image processing chip to enhance the resolution and the refresh rate of the OSD signal.

In some embodiments, the display method further includes:

in response to decoding the input signal by the SoC, respectively segmenting the decoded audio and video signals taking one or more frames, and marking the segmented audio and video signals;

prior to outputting the video signal to a screen for display, outputting the audio signal to a power amplifier for playing and outputting the video signal to a screen for display synchronously, based on the segmenting and marking of the audio signal and the video signal.

In some embodiments, the display method further includes:

judging, by the SoC, whether the sound played by the power amplifier is synchronized with the image displayed on the screen, based on a test result of black and white signals; and in response that the sound played by the power amplifier fails to be synchronized with the image displayed on the screen, adjusting an output timing of the audio signal or the video signal, based on the segmenting and marking of the audio signal and the video signal, to allow the sound played by the power amplifier to be synchronized with the image displayed on the screen.

Further, the present disclosure also provides a display device, which includes a processor, and a memory storing one or more programs including instructions that, when executed by the processor, cause the device to perform the operations regarding the above-mentioned display method.

Furthermore, the present disclosure also provides a television, which includes an 8K decoding chip and an image processing chip, wherein the television further includes the above-mentioned display device.

Further, the present disclosure also provides a computer readable storage medium, a program for display is stored on the computer-readable storage medium, and when executed by a processor, the program implements the operations regarding the display method described above.

In the present disclosure, the OSD signal is output separately from the video signal with resolution of 8K or less after decoding, in order to prevent a defective OSD image because of the mixing of the OSD signal with the video signal with resolution of 8K or less and the outputting to the back end for processing. Specifically, if the video signal is a video signal with resolution of 8K, the video signal is output to the back end for processing through a first interface and the OSD signal generated by an SoC is output to the back end for processing through a second interface. If the video signal is a 4K or video signal having 2K resolution, the video signal is preprocessed and then output to the back end for processing through the second interface, and the OSD signal generated by the SoC is output to the back end for processing through the first interface. Finally, the video signal and OSD signal having a same signal format, reso- lution and refresh rate, which are formed after the back-end processing independently, are mixed and coded for outputting to the screen for display. It may ensure a normal display of video images, realizing the normal display of OSD images and improving the user experience.

The implementation, functional features and advantages of the present application will be further described with reference to the accompanying drawings with the embodiments.

DETAILED DESCRIPTION OF THE EMBODIMENTS

It should be understood that the specific embodiments described herein are only for the purpose of explaining the present disclosure and are not intended to limit the present disclosure.

The disclosure provides a display device.

Figure 1:
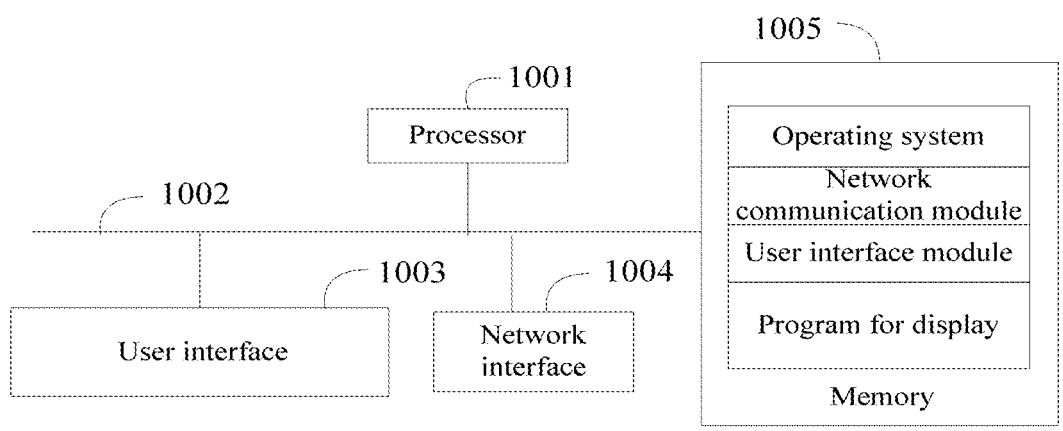
FIG. 1 is a schematic diagram of a hardware operating environment of display device according to an embodiment of the present disclosure.

Referring to FIG. 1, FIG. 1 is a schematic diagram of a hardware operating environment of display device according to an embodiment of the present disclosure.

The display device of the present disclosure is particularly applied to television.

As shown in FIG. 1, the display device can include a processor 1001, such as a CPU. The display device of the present disclosure is applied to a TV, so the processor 1001 is preferably a System-on-Chip (SoC). The SoC is called a system on chip, which is an integrated circuit with a special purpose, which contains a complete system and all the contents of embedded software.

In addition, the display device may further include a communication bus 1002, a user interface 1003, a network interface 1004 and a memory 1005. The communication bus 1002 is configured to implement connection and communication between these components. The user interface 1003 may include a Display and an input unit such as a Keyboard, and the optional user interface 1003 may also include a standard wired interface and a wireless interface. The network interface 1004 may optionally include a standard wired interface and a wireless interface (such as a WI-FI interface). The memory 1005 may be a high speed RAM memory or a non-volatile memory such as a disk memory. The memory 1005 may optionally be a storage device independent of the aforementioned processor 1001. It should be noted that the processor 1001 is an embedded chip installed in the display device.

It would be understood by those skilled in the art that the structure shown in FIG. 1 does not constitute a limitation to the device, which may include more or fewer components than shown, or some components may be combined, or different components arranged.

As shown in FIG. 1, the memory 1005, which is a computer readable storage medium, may include an operating system, a network communication module, a user interface module, and a program for displaying by a terminal. In which, the operating system is a program that manages and controls mobile terminals and resources, and supports the operation of network communication module, user interface module, display program and other programs or software. The network communication module is configured to manage and control the network interface 1004. The user interface module is configured to manage and control the user interface 1003.

In the hardware structure of the display device shown in FIG. 1, the network interface 1004 is mainly used to connect with the system background for data communication with the system background. The user interface 1003 is mainly used for connecting a client (user terminal) and performing data communication with the client. The display device calls the display program stored in the memory 1005 through the processor 1001 and performs the following operations:

decoding, by a SoC, an input signal comprising an audio signal and a video signal, and identifying a resolution of the decoded video signal;

in response that the video signal has an 8K resolution, outputting the video signal to an back end for processing through a first interface, and outputting an on-screen display adjustment signal (OSD signal) to the back end for processing through a second interface, wherein the OSD signal is generated from the SoC;

in response that the video signal has a 4K or 2K resolution, preprocessing and outputting the video signal to the back end for processing through the second interface, and outputting the OSD signal generated by the SoC to the back end for processing through the first interface; and mixing and coding the video signal and the OSD signal, and outputting the mixed and coded signal to a screen for display, where the video signal and the OSD signal has a same signal format, a same resolution and a same refresh rate.

Further, the first interface comprises a PCI-E interface and the second interface comprises a VBO interface. The display device calls the display program stored in the memory 1005 through the processor 1001 and also performs the following operations:

in response that the video signal has the 8K resolution, converting, by the SoC, the video signal into a PCI-E format and outputting the video signal to an 8K decoding chip through the PCI-E interface, to allow the 8K decoding chip to convert the video signal into a VBO format;

outputting the video signal in the VBO format converted by the 8K decoding chip to an image processing chip, to allow the image processing chip to enhance the refresh rate of the video signal;

in response that the video signal has the 8K resolution, converting, by the SoC, the OSD signal generated by the SoC into the VBO format, and outputting the OSD signal to the image processing chip through the VBO interface, to allow the image processing chip to enhance the resolution and the refresh rate of the OSD signal, respectively.

Further, the display device calls the display program stored in the memory 1005 through the processor 1001 and performs the following operations:

in response that the video signal has the 4K resolution, converting, by the SoC, the video signal into a VBO format, and outputting the video signal to the image processing chip through the VBO interface, to allow the image processing chip to enhance the resolution and the refresh rate of the video signal, respectively.

in response that the video signal has the 4K resolution, converting, by the SoC, the OSD signal generated by the SoC into a PCI-E format and outputting the video signal to an 8K decoding chip through the PCI-E interface, to allow the 8K decoding chip to convert the OSD signal into a VBO format;

outputting the OSD signal in the VBO format converted by the 8K decoding chip to an image processing chip, to allow the image processing chip to enhance the resolution and the refresh rate of the OSD signal.

Further, the display device calls the display program stored in the memory 1005 through the processor 1001 and performs the following operations:

in response that the video signal has the 2K resolution, enhancing the 2K resolution into the 4K resolution, converting, by the SoC, the video signal into a VBO format, and outputting the video signal to the image processing chip through the VBO interface, to allow the image processing chip to enhance the resolution and the refresh rate of the video signal, respectively.

in response that the video signal has the 2K resolution, converting, by the SoC, the OSD signal generated by the SoC into a PCI-E format and outputting the video signal to an 8K decoding chip through the PCI-E interface, to allow the 8K decoding chip to convert the OSD signal into a VBO format;

outputting the OSD signal in the VBO format converted by the 8K decoding chip to an image processing chip, to allow the image processing chip to enhance the resolution and the refresh rate of the OSD signal.

Further, the display device calls the display program stored in the memory 1005 through the processor 1001 and performs the following operations:

in response to decoding the input signal by the SoC, respectively segmenting the decoded audio and video signals taking one or more frames, and marking the segmented audio and video signals;

prior to outputting the video signal to a screen for display, outputting the audio signal to a power amplifier for playing and outputting the video signal to a screen for display synchronously, based on the segmenting and marking of the audio signal and the video signal.

Further, the display device calls the display program stored in the memory 1005 through the processor 1001 and performs the following operations:

judging, by the SoC, whether the sound played by the power amplifier is synchronized with the image displayed on the screen, based on a test result of black and white signals; and in response that the sound played by the power amplifier fails to be synchronized with the image displayed on the screen, adjusting an output timing of the audio signal or the video signal, based on the segmenting and marking of the audio signal and the video signal, to allow the sound played by the power amplifier to be synchronized with the image displayed on the screen.

The disclosure further provides a television.

The TV of this embodiment supports video playback with 8K resolution and 120 Hz refresh rate. Since the existing video sources typically have 2K, 4K or 8K resolution and 60 Hz refresh rate, the TV of this embodiment includes 8K decoding chip and image processing chip in order to decode 8K resolution video and improve the resolution and refresh rate of playing video.

(1) 8K Decoding Chip

At present, 8K video can only be decoded by adding an 8K decoding chip, before the 8K video signal is output in HDMI or VBO format.

(2) Image Processing Chip

The current technology develops an 8K ultra-high definition screen in hardware, but the existing video sources are typically 2K or 4K. Even though there has an 8K resolution video source, the refresh rate of 60 Hz may affect the user's visual experience on the 8K ultra-high definition screen. Therefore, it is desirable to improve the resolution and refresh rate of existing video sources through image processing chips.

The common solution to improve the resolution of 2K to 4K and 4K to 8K is to stretch or compress the image through Scaler display processing chip. Scaler actually changes the horizontal and vertical resolutions of the image to make the video content suitable for the display resolution.

At present, the common solution to upgrade 60 Hz video signal to 120 Hz video signal is to add Motion Estimate and Motion Compensation (MEMC) at the back end of 60 Hz output signal to improve the frame rate of display image. The function of MEMC chip is to use dynamic image system to estimate motion according to two or more frames of images, and insert a frame of motion compensation frame between the traditional two frames of images through a specific pin algorithm, so as to improve the refresh rate from 60 Hz to 120 Hz.

(3) Display Device

In the related art, it is typically impossible to call up OSD menu in the playing of video having 8K/120 hz. The OSD menu can only be called up after exiting the playing video. If the OSD menu is forcibly called up when playing 8K/120 Hz video, the OSD menu will have poor display and blurred edges, which will affect the user experience.

In this embodiment, the OSD signal is separated from the video signal with resolution of 8K or less through the display device, thus avoiding the problem of defective OSD image when the OSD signal is mixed with the video signal with resolution of 8K or less and output to the back-end for processing.

In this embodiment, the 8K decoding chip, the image processing chip and the display device (including the SoC) can communicate with each other, send or receive control instructions. For example, the SoC sends system control signals to the 8K decoding chip and the image processing chip respectively, to control the 8K decoding chip and the image processing chip to process video signals and OSD signals.

The following embodiments of the display method of the present disclosure are proposed based on the equipment hardware running environment and the function modules of the TV related to the above embodiments of the display device of the present disclosure.

Normally, OSD signals are mixed with 4K or 8K video signals and processed again at the back end, such as FRC processing by the back-end MEMC chip (to improve the refresh rate). When the OSD menu is opened, the OSD images are also FRC processed by the MEMC chip, which leads to defective OSD images.

Figure 2:
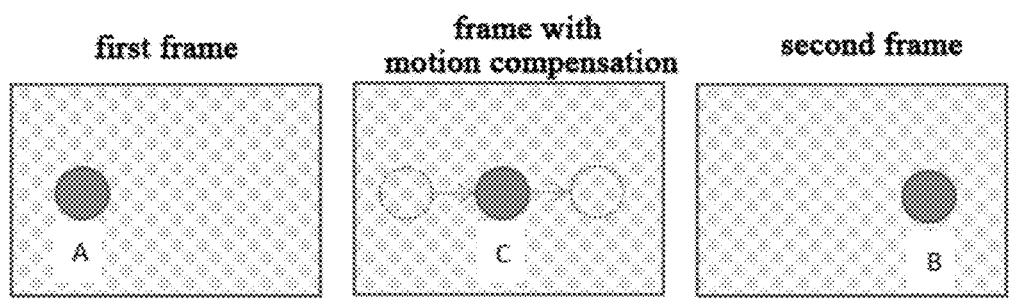
FIG. 2 is a schematic diagram of MEMC compensation processing regarding the display method according to an embodiment of the present disclosure.

The defect of OSD image can be explained by the example shown in FIG. 2. In FIG. 2, the moving video ball in the first frame is in the position A and the moving video ball in the second frame is in the position B. A motion compensation frame is inserted between the first frame and the second frame through MEMC specific pin algorithm. As such, the ball is displayed in the position C in the image. MEMC technology processes the video signal of the whole image. If the OSD menu interface is called currently, and since the OSD menu interface is mostly still images, the OSD menu interface may also participate in the MEMC motion algorithm processing. The OSD image will be processed together, and the OSD menu interface also intuitively shows as image edge jitter and sawtooth, thus affecting the user's visual experience.

Figure 3:
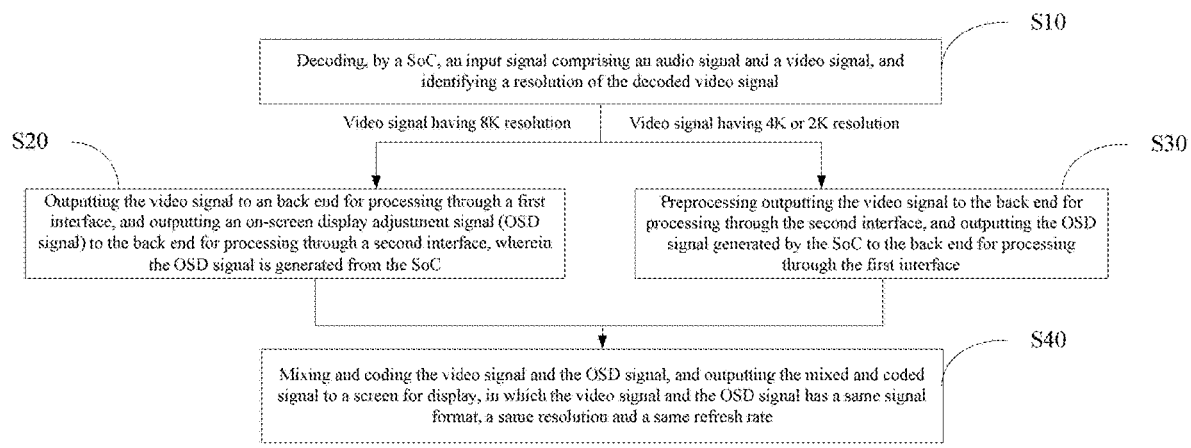
FIG. 3 is a flow chart of a display method according to a first embodiment of the present disclosure.

Referring to FIG. 3, FIG. 3 is a flow chart of a display method according to a first embodiment of the present disclosure. To solve the problem of defective OSD image display, in this embodiment, the display method includes the following operations:

operation S10, decoding, by a SoC, an input signal comprising an audio signal and a video signal, and identifying a resolution of the decoded video signal;

In this embodiment, audio and video signals can be input into the SoC for processing through HDMI, USB, Internet, etc. In order to realize the separate output of video signal and OSD signal, SoC has at least two signal output channels.

At present, 8K video decoding in the related art can only be processed by adding 8K decoding chips, to ensure 8K video signals in HDMI or VBO format can be output. The video signal having 8K resolution can only be output through signal output channels connected with 8K decoding chips.

Therefore, when the SoC decodes the input audio and video signals, it needs to identify the resolution corresponding to the decoded video signals first, and then determine the corresponding signal output channel (output interface) based on the resolution. The resolution of the video signal can be specifically determined based on the encoding mode or encoding parameters of the video signal.

Operation S20, in response that the video signal has an 8K resolution, outputting the video signal to an back end for processing through a first interface, and outputting an on-screen display adjustment signal (OSD signal) to the back end for processing through a second interface, wherein the OSD signal is generated from the SoC.

In this embodiment, if the currently decoded video signal is an video signal having 8K resolution. It is necessary to output the video signal having 8K resolution to the back-end module which includes the 8K decoding chip through the signal output channel connected with the 8K decoding chip for processing, such as signal format conversion and refresh rate enhancement.

In this embodiment, it is preferable to output the video signal having 8K resolution to the back end for processing through the first interface, and output the OSD signal to the back end for processing through the second interface, wherein the first interface is connected with the 8K decoding chip.

Operation S30, in response that the video signal has a 4K or 2K resolution, preprocessing outputting the video signal to the back end for processing through the second interface, and outputting the OSD signal generated by the SoC to the back end for processing through the first interface.

In this embodiment, if the currently decoded video signal is a video signal with 4K or 2K resolution, that is, 8K decoding is not required. The video signal then can be output to the back end for processing through a common signal transmission channel. In addition, before outputting the video signal with 4K or 2K resolution to the back-end processing, preprocessing, such as signal format conversion and video signal resolution enhancement, is required.

In this embodiment, it is preferable to preprocess the video signal with 4K or 2K resolution and output it to the back end for processing through the second interface, while the OSD signal is output to the back end for processing through the first interface.

Operation S40, mixing and coding the video signal and the OSD signal, and outputting the mixed and coded signal to a screen for display, wherein the video signal and the OSD signal has a same signal format, a same resolution and a same refresh rate.

In this embodiment, since the video signal and OSD signal are output separately at the SoC end and processed independently at the back end, the back end needs to mix and encode the video signal and OSD signal before outputting to the screen for display.

In this embodiment, the video signal and OSD signal after the final processing at the back end preferably have the same signal format, same resolution and same refresh rate. For example, both the video signal and OSD signal have VBO signal format, 8K resolution and 120 Hz refresh rate.

In the present disclosure, the OSD signal is output separately from the video signal with resolution of 8K or less after decoding, in order to prevent a defective OSD image because of the mixing of the OSD signal with the video signal with resolution of 8K or less and the outputting to the back end for processing. Specifically, if the video signal is a video signal with resolution of 8K, the video signal is output to the back end for processing through a first interface and the OSD signal generated by an SoC is output to the back end for processing through a second interface. If the video signal is a 4K or video signal having 2K resolution, the video signal is preprocessed and then output to the back end for processing through the second interface, and the OSD signal generated by the SoC is output to the back end for processing through the first interface. Finally, the video signal and OSD signal having a same signal format, resolution and refresh rate, which are formed after the back-end processing independently, are mixed and coded for outputting to the screen for display. It may ensure a normal display of video images, realizing the normal display of OSD images and improving the user experience.

In the present disclosure, the types of the first interface and the second interface in the above embodiments are not limited, and are specifically set according to actual needs. For example, the first interface may include PCI-E interface, VGA interface, DVI interface and HDMI interface, and the second interface may include VBO interface, IBO interface and VAO interface.

To facilitate the understanding of the display method of the present disclosure, the above embodiments will be described in detail below with the first interface being PCI-E interface and the second interface being VBO interface.

Embodiment 1: Processing of Video Signal Having 8K Resolution and OSD Signal 1. processing flow of video signal having 8K resolution
1.1. the SoC converts video signals into PCI-E format;
1.2. the SoC outputs the video signal in PCI-E format to the 8K decoding chip through the PCI-E interface;
1.3. the SoC controls the 8K decoding chip to convert video signal into VBO format;
1.4. the SoC outputs the video signal in VBO format to the image processing chip for the image processing chip to improve the refresh rate of the video signal.

Figure 4:
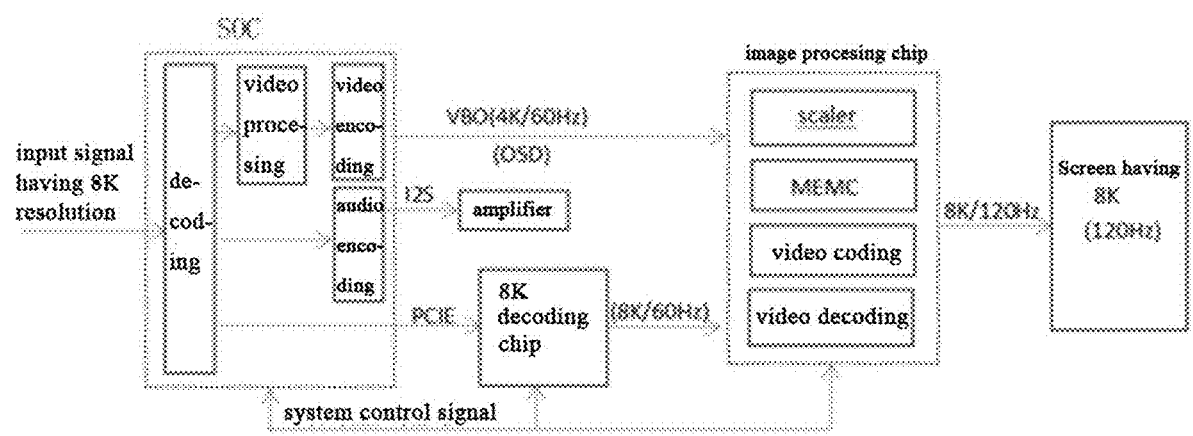
FIG. 4 is a schematic flow diagram of processing the video signal having 8K resolution and the OSD signal in the display method according to an embodiment of the present disclosure.

As shown in FIG. 4, when a signal with 8K resolution is input, the SoC decodes and identifies the input signal with 8K resolution, and then separates the audio from the image. After the audio signal is processed by the SoC, the I2S format audio signal is output through audio coding, while the video signal is converted into PCI-E format and directly output to the 8K decoding chip. After receiving 8K code stream, the 8K decoding chip performs decoding, format conversion and other processing on the video signal. The video signal of 8K@60 Hz and VBO format is output, which is decoded by the image processing chip and then converted into the video signal of 8K@120 Hz and VBO format.

2. Processing flow of the OSD signal
2.1. the SoC converts the OSD signal generated by the SoC into VBO format;
2.2. the SoC outputs the OSD signal in VBO format to the image processing chip through the VBO interface;
2.3. the SoC controls the image processing chip to perform resolution enhancement and refresh rate enhancement on the OSD signal, respectively.

As shown in FIG. 4, since the received input signal is judged to be 8K resolution signal when the SoC decodes the input signal, the SoC converts the OSD signal generated by itself into VBO format, outputs the OSD signal of 4 k @ 60 hz through the VBO interface within a VBO protocol. The OSD signal then enters the image processing chip, where it is decoded, the scaler resolution and MEMC refresh rate are enhanced. It is then converted into an OSD signal in 8K@120 Hz and VBO format, and finally mixed with the video signal in the format of 8K@120 Hz and VBO after MEMC refresh rate enhancement. The mixed signal are then output to the screen synchronously. The defect of the OSD signal after MEMC processing are thus avoided and a normal display of the OSD image is carried out. For the above processes, the 8K decoding chip and image processing chip are controlled by SoC to make corresponding processing functions.

Embodiment 2: Processing of Video Signal Having 4K Resolution and OSD Signal 1. Processing flow of video signal having 4K resolution
1.1. the SoC converts the video signal into VBO format;
1.2. the SoC outputs the video signal in VBO format to the image processing chip through the VBO interface;
1.3. the SoC controls the image processing chip to perform resolution enhancement and refresh rate enhancement on the video signal, respectively.

Figure 5:
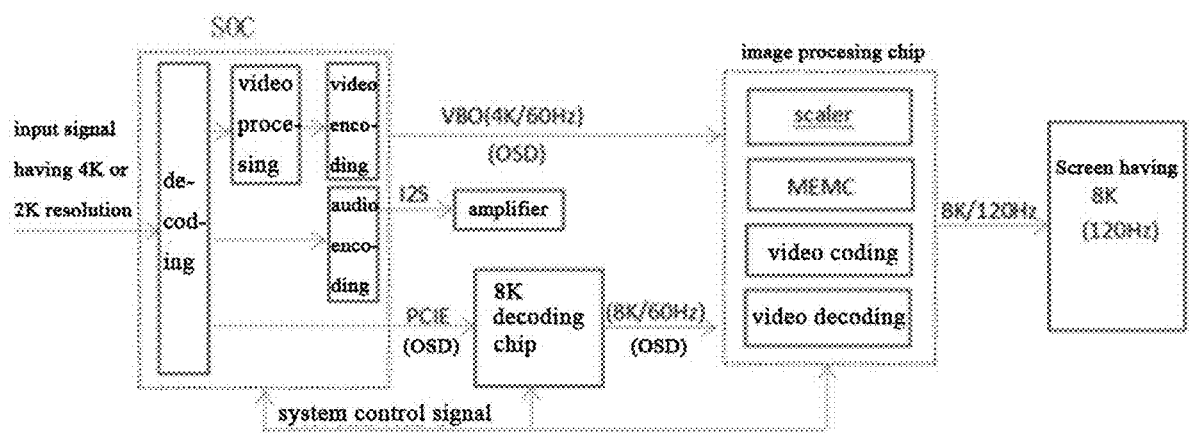
FIG. 5 is a schematic flow diagram of processing the video signal having 4K or 2K resolution and the OSD signal in the display method according to an embodiment of the present disclosure.

As shown in FIG. 5, when a signal with 4K resolution is input, the SoC decodes and identifies the input signal with 4K resolution, and then separates the audio from the image. After the audio signal is processed by the SoC, the audio signal is output through audio coding in I2S format. The SoC directly decodes the video signal and outputs the video signal in 4K@60 Hz and VBO format after video coding. The video signal in 4K@60 Hz and VBO format is decoded in the image processing chip, and its resolution is improved by scaler function in the image processing chip (i.e., 4K to 8K), before outputting the video signal in 8K@60 Hz and VBO format, which is afterwards compensated by motion frame by MEMC function in the image processing chip, thus improving the refresh rate from 60 Hz to 120 Hz.

2. Processing flow of the OSD signal 2.1. the SoC converts the OSD signal generated by the SoC into PCI-E format;

2.2. the SoC outputs the OSD signal in PCI-E format to the 8K decoding chip through the PCI-E interface;

2.3. the SoC controls the 8K decoding chip to convert the OSD signal into VBO format;

2.4. the SoC outputs the OSD signal in VBO format obtained by the 8K decoding chip after signal format conversion to the image processing chip;

2.5. the SoC controls the image processing chip to perform resolution enhancement and refresh rate enhancement on the OSD signal, respectively.

As shown in FIG. 5, when the SoC decodes the input signal, it is judged that the received input signal is 4K resolution signal. The SoC converts the OSD signal generated by itself into PCI-E format, and then outputs it to the 8K decoding chip through the PCI-E interface, and then outputs the OSD signal of 4K@60 Hz within the VBO protocol after signal conversion by the 8K decoding chip. The OSD signal then enters the image processing chip for decoding. And after scaler resolution enhancement and MEMC refresh rate enhancement, it is converted into an OSD signal in 8K@120 Hz and VBO format. Finally, it is mixed with the video signal in 8K@120 Hz and VBO format after MEMC refresh rate enhancement, and output to the screen synchronously. Defective image of OSD signal after MEMC processing is thus avoided and the OSD image can be displayed normally. For the above processes, the 8K decoding chip and image processing chip are controlled by SoC to make corresponding processing functions.

Embodiment 3: Processing of Video Signal Having 2K Resolution and OSD Signal

1. Processing flow of video signal having 2K resolution 1.1. the SoC improves the video signal from 2K resolution to 4K resolution and converts it into VBO format;

1.2. the SoC outputs the video signal in VBO format to the image processing chip through the VBO interface;

1.3. the SoC controls the image processing chip to perform resolution enhancement and refresh rate enhancement on the video signal, respectively.

As shown in FIG. 5, when a signal with 2K resolution is input, the SoC decodes and identifies the input signal with 2K resolution, and then separates the audio from the image. After the audio signal is processed by the SoC, the audio signal is output through audio coding in I2S format. When decoding the video signal having 2K resolution, the SoC improves the 2K resolution to 4K resolution, and then outputs the video signal in 4K@60 Hz and VBO format through video coding. The video signal of 4K@60 Hz and VBO format is decoded in the image processing chip, and its resolution is improved by scaler function in the image processing chip (i.e., 4K to 8K). The video signal of 8K@60 Hz and VBO format is then output, which is compensated by motion frame by MEMC function in the image processing chip, thus improving the refresh rate from 60 Hz to 120 Hz.

2. Processing flow of the OSD signal 2.1. the SoC converts the OSD signal generated by the SoC into PCI-E format;

2.2. the SoC outputs the OSD signal in PCI-E format to the 8K decoding chip through the PCI-E interface;

2.3. SoC controls the 8K decoding chip to convert the OSD signal into VBO format;

2.4. the SoC outputs the OSD signal in VBO format obtained by the 8K decoding chip after signal format conversion to the image processing chip;

2.5. the SoC controls the image processing chip to perform resolution enhancement and refresh rate enhancement on the OSD signal, respectively.

As shown in FIG. 5, when the SoC decodes the input signal, it is judged that the received input signal is 2K resolution signal. The SoC converts the OSD signal generated by itself into PCI-E format, and then outputs it to 8K decoding chip through the PCI-E interface, and then outputs the OSD signal of 4K@60 Hz within the VBO protocol after signal conversion by the 8K decoding chip. The OSD signal then enters the image processing chip for decoding. And after scaler resolution enhancement and MEMC refresh rate enhancement, it is converted into an OSD signal in 8K@120 Hz and VBO format. Finally, it is mixed with the video signal in 8K@120 Hz and VBO format after MEMC refresh rate enhancement, and output to the screen synchronously. Defective image of OSD signal after MEMC processing is thus avoided and the OSD image can be displayed normally. For the above processes, the 8K decoding chip and image processing chip are controlled by SoC to make corresponding processing functions.

Further, in the above embodiments, the processes of decoding of the video signal by the SoC, outputting the separated video signal and audio signal, and encoding and outputting the separated audio signal, may take quantities of time, as the video signals having 8K resolution contains lots of data. The video signal having 8K resolution may take more time to process, which leads to dis-synchronization of the output sound and the image.

As such, the present disclosure also provides a method for synchronizing sound and image, including the operations:

(1) in response to decoding the input signal by the SoC, respectively segmenting the decoded audio and video signals taking one or more frames, and marking the segmented audio and video signals;

(2) prior to outputting the video signal to a screen for display, outputting the audio signal to a power amplifier for playing and outputting the video signal to a display screen for display synchronously, based on the segmenting and marking of the audio signal and the video signal.

Figure 6:
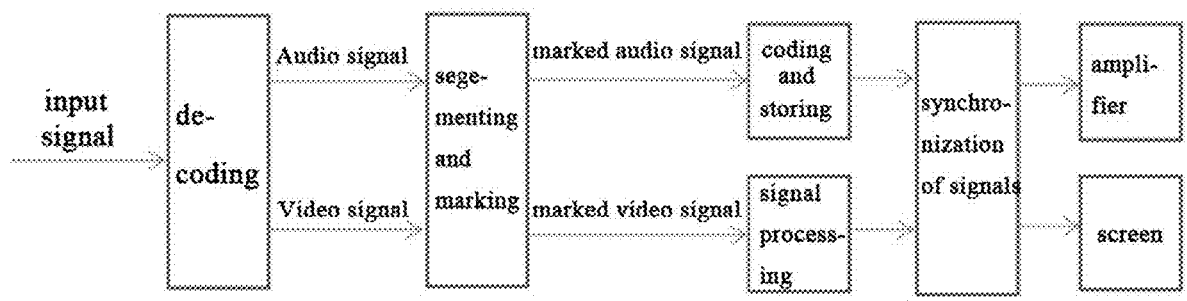
FIG. 6 is a schematic diagram of synchronization processing of audio signal and video signal in the display method according to an embodiment of the present disclosure.

As shown in FIG. 6, the input signal (i.e., audio and video signal) is decoded by SoC and output respectively an audio signal and a video signal, which are segmented by a cycle according to each frame or multiple frames of the input signal and marked. The segmented and marked audio signal is decoded and stored, and wait for the whole processing flow of the segmented and marked video signal to be completed. After notifying the SoC, and the segmented and marked video signal and the stored segmented marked audio signal are output synchronously.

Further optionally, because the audio signal will be delayed after being processed by power amplifier, and the video signal will be delayed after being displayed on the screen, if the delay for the above two is different, dis-synchronized sound and image may exist.

As such, this embodiment provides the followings:

(1) judging, by the SoC, whether the sound played by the power amplifier is synchronized with the image displayed on the screen, based on a test result of black and white signals; and (2) in response that the sound played by the power amplifier fails to be synchronized with the image displayed on the screen, adjusting an output timing of the audio signal or the video signal, based on the segmenting and marking of the audio signal and the video signal, to allow the sound played by the power amplifier to be synchronized with the image displayed on the screen.

(3) outputting the video signal to a display screen for display synchronously, based on the segmenting and marking of the audio signal and the video signal.

In this embodiment, the SoC can judge whether the sound played by the power amplifier is synchronized with the image displayed on the screen based on the test of black and white field signals (assuming that there is sound in the white field and no sound in the black field).

If the sound played by the power amplifier is not synchronized with the image displayed on the screen, it is required to adjust the audio signal or video signal at the front end to realize the synchronization of sound and image at the back end. Specifically, the output time of audio signal or video signal can be adjusted based on the segmenting and marking of audio signal and video signal, and then output synchronously after adjustment, so as synchronize the audio and image at the TV terminal.

In this embodiment, the sound played by the power amplifier can be synchronized with the image displayed on the screen by first determining the time difference between sound playing and image display, and then adjusting the output time of audio signal or video signal based on the time difference, or the sound played by the power amplifier can be synchronized with the image displayed on the screen by continuously fine-tuning the output time of audio signal or video signal and testing black and white field signals for many times.

For example, the delay time T1 of audio signal after power amplifier processing is 0.3 seconds, while the delay time T2 of video signal after screen display is 0.7 seconds, that is, there is a lag time of 0.4 seconds between screen display and sound playing, so it is necessary to adjust the time difference of the output of audio signal or video signal.

There are two ways to adjust the time difference. One is to delay the output of the audio signal by 0.4 seconds by based on the segmentation mark (equivalent to time stamp) of the audio signal and the video signal. The other is to advance the output of the video signal by 0.4 seconds based on the segmenting and marking of the audio signal and the video signal, so as to achieve the synchronization of audio and image at the TV terminal.

In addition, the present disclosure further provides a computer readable storage medium.

A program for display by the terminal is stored on the computer-readable storage medium, and when executed by a processor, the program implements the operations described in the above embodiments regarding the display method described above.

From the above description of the embodiments, those skilled in the art can clearly understand that the method of the above embodiments can be implemented by means of software plus necessary general-purpose hardware platforms. Of course, it can also be implemented by means of hardware, but in many cases the former is a better embodiment. Based on this understanding, the technical solution of the present application can be embodied in the form of a software product, which is stored in a storage medium (such as ROM/RAM, magnetic disk, optical disk) as described above, and includes several instructions to cause a terminal device (which can be a mobile phone, a computer, a television, a server, or a network device, etc.) to perform the methods described in various embodiments of the present application.

The embodiments of the present disclosure have been described above with reference to the drawings, but the present disclosure is not limited to the specific embodiments described above. The embodiments described are only illustrative, but not restrictive. Under the inspiration of the present disclosure, people of ordinary skill in the art can make many modifications without departing from the scope protected by the purpose of the present disclosure and the claims. Any equivalent structure or flow modification made by using the contents of the present specification and drawings, or directly or indirectly applied to other related technical fields, shall fall within the protection scope of the present disclosure.

We claim:

1. A display method, comprising:
   decoding, by a SoC, an input signal comprising an audio signal and a video signal, and identifying a resolution of the decoded video signal;
   in response that the video signal has an 8K resolution, outputting the video signal to a back end for processing through a first interface, and outputting an on-screen display adjustment signal (OSD signal) to the back end for processing through a second interface, wherein the OSD signal is generated from the SoC;
   in response that the video signal has a 4K or 2K resolution, preprocessing and outputting the video signal to the back end for processing through the second interface, and outputting the OSD signal generated by the SoC to the back end for processing through the first interface; and
   mixing and coding the video signal and the OSD signal, and outputting the mixed and coded signal to a screen for display, wherein the video signal and the OSD signal has a same signal format, a same resolution and a same refresh rate.

2. The display method according to claim 1, wherein the first interface comprises a PCI-E interface, and the second interface comprises a VBO interface.

3. The display method according to claim 2, wherein, the operation of in response that the video signal has the 8K resolution, outputting the video signal to a back end for processing through a first interface, and outputting an on-screen display adjustment signal (OSD signal) to the back end for processing through a second interface, wherein the OSD signal is generated from the SoC, comprises:
   in response that the video signal has the 8K resolution, converting, by the SoC, the video signal into a PCI-E format and outputting the video signal to an 8K decoding chip through the PCI-E interface, to allow the 8K decoding chip to convert the video signal into a VBO format;
   outputting the video signal in the VBO format converted by the 8K decoding chip to an image processing chip, to allow the image processing chip to enhance the refresh rate of the video signal; and
   converting, by the SoC, the OSD signal generated by the SoC into the VBO format, and outputting the OSD signal to the image processing chip through the VBO interface, to allow the image processing chip to enhance the resolution and the refresh rate of the OSD signal, respectively.

4. The display method according to claim 3, further comprising:
   in response to decoding the input signal by the SoC, respectively segmenting the decoded audio and video signals taking one or more frames, and marking the segmented audio and video signals; and outputting the audio signal to a power amplifier for playing and outputting the video signal to a screen for display synchronously, based on the segmenting and marking of the audio signal and the video signal.

5. The display method according to claim 2, wherein, the operation of in response that the video signal has a 4K or 2K resolution, preprocessing and outputting the video signal to the back end for processing through the second interface, and outputting the OSD signal generated by the SoC to the back end for processing through the first interface, comprises:

in response that the video signal has the 4K resolution, converting, by the SoC, the video signal into a VBO format, and outputting the video signal to the image processing chip through the VBO interface, to allow the image processing chip to enhance the resolution and the refresh rate of the video signal, respectively;

converting, by the SoC, the OSD signal generated by the SoC into a PCI-E format and outputting the video signal to an 8K decoding chip through the PCI-E interface, to allow the 8K decoding chip to convert the OSD signal into a VBO format; and outputting the OSD signal in the VBO format converted by the 8K decoding chip to an image processing chip, to allow the image processing chip to enhance the resolution and the refresh rate of the OSD signal.

6. The display method according to claim 5, further comprising:

in response to decoding the input signal by the SoC, respectively segmenting the decoded audio and video signals taking one or more frames, and marking the segmented audio and video signals; and outputting the audio signal to a power amplifier for playing and outputting the video signal to a screen for display synchronously, based on the segmenting and marking of the audio signal and the video signal.

7. The display method according to claim 2, wherein, the operation of in response that the video signal has the 2K resolution, preprocessing and outputting the video signal to the back end for processing through the second interface, and outputting the OSD signal generated by the SoC to the back end for processing through the first interface, comprises:

in response that the video signal has the 2K resolution, enhancing the 2K resolution into the 4K resolution, converting, by the SoC, the video signal into a VBO format, and outputting the video signal to the image processing chip through the VBO interface, to allow the image processing chip to enhance the resolution and the refresh rate of the video signal, respectively.

converting, by the SoC, the OSD signal generated by the SoC into a PCI-E format and outputting the video signal to an 8K decoding chip through the PCI-E interface, to allow the 8K decoding chip to convert the OSD signal into a VBO format; and outputting the OSD signal in the VBO format converted by the 8K decoding chip to an image processing chip, to allow the image processing chip to enhance the resolution and the refresh rate of the OSD signal.

8. The display method according to claim 7, further comprising:

in response to decoding the input signal by the SoC, respectively segmenting the decoded audio and video signals taking one or more frames, and marking the segmented audio and video signals; and outputting the audio signal to a power amplifier for playing and outputting the video signal to a screen for display synchronously, based on the segmenting and marking of the audio signal and the video signal.

9. The display method according to claim 1, further comprising:

in response to decoding the input signal by the SoC, respectively segmenting the decoded audio and video signals taking one or more frames, and marking the segmented audio and video signals; and outputting the audio signal to a power amplifier for playing and outputting the video signal to a screen for display synchronously, based on the segmenting and marking of the audio signal and the video signal.

10. The display method according to claim 9, further comprising:

judging, by the SoC, whether the sound played by the power amplifier is synchronized with the image displayed on the screen, based on a test result of black and white signals; and in response that the sound played by the power amplifier fails to be synchronized with the image displayed on the screen, adjusting an output timing of the audio signal or the video signal, based on the segmenting and marking of the audio signal and the video signal, to allow the sound played by the power amplifier to be synchronized with the image displayed on the screen.

11. A display device, comprising a processor, and a memory storing one or more programs for display, wherein the one or more programs comprise operations that, when executed by the processor, cause the display device to:

decoding, by a SoC, an input signal comprising an audio signal and a video signal, and identifying a resolution of the decoded video signal;

in response that the video signal has an 8K resolution, outputting the video signal to a back end for processing through a first interface, and outputting an on-screen display adjustment signal (OSD signal) to the back end for processing through a second interface, wherein the OSD signal is generated from the SoC;

in response that the video signal has a 4K or 2K resolution, preprocessing outputting the video signal to the back end for processing through the second interface, and outputting the OSD signal generated by the SoC to the back end for processing through the first interface; and mixing and coding the video signal and the OSD signal, and outputting the mixed and coded signal to a screen for display, wherein the video signal and the OSD signal has a same signal format, a same resolution and a same refresh rate.

12. The display device according to claim 11, wherein the one or more programs further comprise operations that, when executed by the processor, cause the display device to:

in response that the video signal has the 8K resolution, converting, by the SoC, the video signal into a PCI-E format and outputting the video signal to an 8K decoding chip through the PCI-E interface, to allow the 8K decoding chip to convert the video signal into a VBO format;

outputting the video signal in the VBO format converted by the 8K decoding chip to an image processing chip, to allow the image processing chip to enhance the refresh rate of the video signal; and converting, by the SoC, the OSD signal generated by the SoC into the VBO format, and outputting the OSD signal to the image processing chip through the VBO interface, to allow the image processing chip to enhance the resolution and the refresh rate of the OSD signal, respectively.

13. The display device according to claim 11, wherein the one or more programs further comprise operations that, when executed by the processor, cause the display device to:
in response that the video signal has the 4K resolution, converting, by the SoC, the video signal into a VBO format, and outputting the video signal to the image processing chip through the VBO interface, to allow the image processing chip to enhance the resolution and the refresh rate of the video signal, respectively.
converting, by the SoC, the OSD signal generated by the SoC into a PCI-E format and outputting the video signal to an 8K decoding chip through the PCI-E interface, to allow the 8K decoding chip to convert the OSD signal into a VBO format; and
outputting the OSD signal in the VBO format converted by the 8K decoding chip to an image processing chip, to allow the image processing chip to enhance the resolution and the refresh rate of the OSD signal.

14. The display device according to claim 11, wherein the one or more programs further comprise operations that, when executed by the processor, cause the display device to:
in response that the video signal has the 2K resolution, enhancing the 2K resolution into the 4K resolution, converting, by the SoC, the video signal into a VBO format, and outputting the video signal to the image processing chip through the VBO interface, to allow the image processing chip to enhance the resolution and the refresh rate of the video signal, respectively.
converting, by the SoC, the OSD signal generated by the SoC into a PCI-E format and outputting the video signal to an 8K decoding chip through the PCI-E interface, to allow the 8K decoding chip to convert the OSD signal into a VBO format; and
outputting the OSD signal in the VBO format converted by the 8K decoding chip to an image processing chip, to allow the image processing chip to enhance the resolution and the refresh rate of the OSD signal.

15. The display device according to claim 11, wherein the one or more programs further comprise operations that, when executed by the processor, cause the display device to:
in response to decoding the input signal by the SoC, respectively segmenting the decoded audio and video signals taking one or more frames, and marking the segmented audio and video signals; and
prior to outputting the video signal to a screen for display, outputting the audio signal to a power amplifier for playing and outputting the video signal to a screen for display synchronously, based on the segmenting and marking of the audio signal and the video signal.

16. A television, comprising: an 8K decoding chip and an image processing chip, wherein the television further comprises the display device as claimed in claim 11.

17. A non-transitory computer readable storage medium, wherein the non-transitory computer readable storage medium stores one or more programs for display, wherein the one or more programs comprise operations that, when executed by a processor, cause the processor to:
decoding, by a SoC, an input signal comprising an audio signal and a video signal, and identifying a resolution of the decoded video signal;
in response that the video signal has an 8K resolution, outputting the video signal to a back end for processing through a first interface, and outputting an on-screen display adjustment signal (OSD signal) to the back end for processing through a second interface, wherein the OSD signal is generated from the SoC;
in response that the video signal has a 4K or 2K resolution, preprocessing outputting the video signal to the back end for processing through the second interface, and outputting the OSD signal generated by the SoC to the back end for processing through the first interface; and
mixing and coding the video signal and the OSD signal, and outputting the mixed and coded signal to a screen for display, wherein the video signal and the OSD signal has a same signal format, a same resolution and a same refresh rate.

18. The non-transitory computer readable storage medium according to claim 17, wherein the one or more programs further comprise operations that, when executed by the processor, cause the processor to:
in response that the video signal has the 8K resolution, converting, by the SoC, the video signal into a PCI-E format and outputting the video signal to an 8K decoding chip through the PCI-E interface, to allow the 8K decoding chip to convert the video signal into a VBO format;
outputting the video signal in the VBO format converted by the 8K decoding chip to an image processing chip, to allow the image processing chip to enhance the refresh rate of the video signal; and
in response that the video signal has the 8K resolution, converting, by the SoC, the OSD signal generated by the SoC into the VBO format, and outputting the OSD signal to the image processing chip through the VBO interface, to allow the image processing chip to enhance the resolution and the refresh rate of the OSD signal, respectively.

19. The non-transitory computer readable storage medium according to claim 17, wherein the one or more programs further comprise operations that, when executed by the processor, cause the processor to:
in response that the video signal has the 4K resolution, converting, by the SoC, the video signal into a VBO format, and outputting the video signal to the image processing chip through the VBO interface, to allow the image processing chip to enhance the resolution and the refresh rate of the video signal, respectively.
in response that the video signal has the 4K resolution, converting, by the SoC, the OSD signal generated by the SoC into a PCI-E format and outputting the video signal to an 8K decoding chip through the PCI-E interface, to allow the 8K decoding chip to convert the OSD signal into a VBO format; and
outputting the OSD signal in the VBO format converted by the 8K decoding chip to an image processing chip, to allow the image processing chip to enhance the resolution and the refresh rate of the OSD signal.

20. The non-transitory computer readable storage medium according to claim 17, wherein the one or more programs further comprise operations that, when executed by the processor, cause the processor to:
in response that the video signal has the 2K resolution, enhancing the 2K resolution into the 4K resolution, converting, by the SoC, the video signal into a VBO format, and outputting the video signal to the image processing chip through the VBO interface, to allow the image processing chip to enhance the resolution and the refresh rate of the video signal, respectively.
in response that the video signal has the 2K resolution, converting, by the SoC, the OSD signal generated by the SoC into a PCI-E format and outputting the video signal to an 8K decoding chip through the PCI-E interface, to allow the 8K decoding chip to convert the OSD signal into a VBO format; and outputting the OSD signal in the VBO format converted by the 8K decoding chip to an image processing chip, to allow the image processing chip to enhance the resolution and the refresh rate of the OSD signal.

* * * * *